(No Model.)

J. C. GITHENS.
PIPE COUPLING.

No. 252,657.　　　　　　　　　Patented Jan. 24, 1882.

Witnesses:
Wm Rumble
Asa Farr

Inventor:
Joseph C. Githens
Per Edw. E. Quimby
Atty

UNITED STATES PATENT OFFICE.

JOSEPH C. GITHENS, OF NEW YORK, N. Y.

PIPE-COUPLING.

SPECIFICATION forming part of Letters Patent No. 252,657, dated January 24, 1882.

Application filed June 17, 1881. (No model.)

*To all whom it may concern:*

Be it known that I, JOSEPH C. GITHENS, of the city and State of New York, have invented a certain Improvement in Pipe-Couplings, of which the following is a specification.

My improvement is especially designed to facilitate the connection and disconnection of steam-tight pipe-couplings; and my invention consists of a pipe coupling the male member of which is composed of a tube provided at its inner end with a curved recess for the admission and engagement of a pin projecting inwardly from the wall of the socket, in which the male member is inserted, the curvature of such recess being such that when the male member is fully inserted in the socket and then turned slightly upon its longitudinal axis the pin acts as a key, which prevents the male member of the coupling from being moved longitudinally out of the socket. The upper portion of the socket is enlarged to receive a packing-ring, which is compressed by means of a perforated screw-plug, through which the male member of the coupling is inserted. By means of the screw-plug the packing is compressed with sufficient force to make the joint steam-tight and to hold the male member of the coupling in its place by friction, if need be. In practice, however, the internal pressure pushes the male member outward with a force, creating such friction of the curved end of the recess upon the pin that the male member is prevented from turning upon its longitudinal axis.

Figure 1:
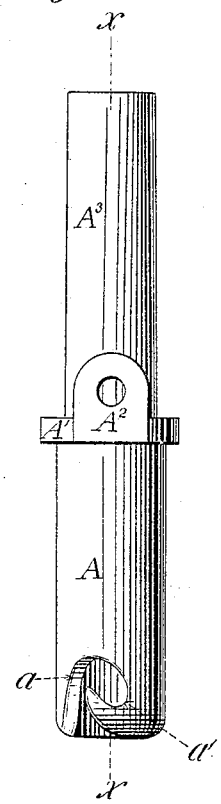
Figure 2:
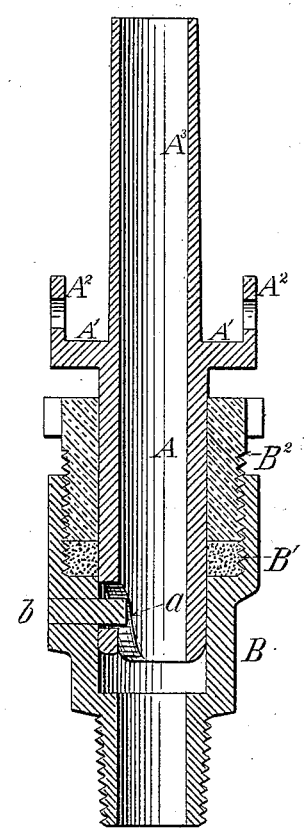

The accompanying drawings of a pipe-coupling embodying my improvement are as follows:

Figure 1 is an elevation of the male member of the coupling, showing the curved recess formed in its inner end. Fig. 2 is a central longitudinal section of the coupling, showing the male member thereof in section through the line $x\ x$ on Fig. 1.

The drawings represent a coupling, the male member A of which is a tube, in the shell of which, in its inner end, is formed the curved recess $a$. This tube has cast upon it the laterally-projecting wings A', provided with the ears A², which are perforated to admit the pins or screws which serve to fasten the end of the tube of flexible material in which the tapering end A³ of the tube A is inserted.

The female member of the coupling consists of a tubular socket, B, provided with the inwardly-projecting pin $b$, which, when the male member of the coupling is inserted in the socket, enters the recess $a$, and when the tube A is turned slightly upon its axis and pulled slightly outward bears upon the bottom $a'$ of the recess $a$, and thus acts as a key, which prevents the pulling apart of the coupling. The outer portion of the socket B is enlarged to receive the packing-ring B', which is compressed by means of the plug B², which screws into the enlarged part of the socket.

The socket and packing-ring and the plug constitute a stuffing-box, by means of which a steam-tight joint is made with the periphery of the pipe A, and sufficient friction is exerted upon the pipe A to prevent its being easily turned and withdrawn from the socket without unscrewing the plug B².

When the necessity arises for disconnecting the coupling the plug B² is unscrewed sufficiently to relieve the packing-ring from compression, and the friction upon pipe A being thus lessened, the latter can be pushed slightly inward and then turned slightly upon its axis and drawn outward, thus disengaging the pin $b$ from the recess $a$ formed in the shell of the inner end of the tube A.

Instead of the screw-plug B², it will of course be understood the perforated plug of an ordinary gland may be used, the function of the plug being merely to facilitate the necessary compression of the packing when the parts of coupling have been connected, or to relieve the packing from pressure, if such relief is necessary, when it is desired to disconnect the coupling.

It will of course be understood that the packing may be sufficiently compressed to make the joint tight without preventing the turning of the tube A upon its axis, so that when the steam is cut off the tube A may be pushed slightly inward and turned to release the pin from the recess and separate the coupling.

I claim as my invention—

In a pipe-coupling, a male member consisting of a tube having formed in its shell, at its inner end, a curved recess, and a female member consisting of a socket provided with an inwardly-projecting pin for engaging the said recess, in combination with a perforated screw-plug inserted into the enlarged part of the socket, and a packing-ring surrounding the male member of the coupling and interposed between the end of the screw-plug and the shoulder at the bottom of the enlarged part of the socket, substantially as described.

JOSEPH C. GITHENS.

Witnesses:
M. L. ADAMS,
F. H. HOWES.